(12) United States Patent
Van Der Waal et al.

(10) Patent No.: US 9,758,649 B2
(45) Date of Patent: Sep. 12, 2017

(54) CURED TRANSPARENT RUBBER ARTICLE, AND MANUFACTURING PROCESS FOR THE SAME

(71) Applicant: KRATON POLYMERS U.S. LLC, Houston, TX (US)

(72) Inventors: Arie Willem Van Der Waal, Ammerstol (NL); Marcus Juergen Greger, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 15/083,784

(22) Filed: Mar. 29, 2016

(65) Prior Publication Data

US 2016/0289430 A1 Oct. 6, 2016

(30) Foreign Application Priority Data

Mar. 30, 2015 (NL) ..................... 2014548

(51) Int. Cl.
| | |
|---|---|
| C08L 9/00 | (2006.01) |
| B29C 45/77 | (2006.01) |
| B29C 45/00 | (2006.01) |
| B29C 45/18 | (2006.01) |
| B29C 45/73 | (2006.01) |
| B29C 45/78 | (2006.01) |
| C08L 7/00 | (2006.01) |
| C08K 3/00 | (2006.01) |

(52) U.S. Cl.
CPC ............ *C08L 9/00* (2013.01); *B29C 45/0001* (2013.01); *B29C 45/18* (2013.01); *B29C 45/73* (2013.01); *B29C 45/77* (2013.01); *B29C 45/78* (2013.01); *C08L 7/00* (2013.01); *B29C 2045/1875* (2013.01); *B29C 2945/76531* (2013.01); *B29C 2945/76595* (2013.01); *B29C 2945/76658* (2013.01); *B29C 2945/76735* (2013.01); *B29K 2995/0026* (2013.01); *C08K 3/0016* (2013.01)

(58) Field of Classification Search
CPC ......... C08L 9/00; B29C 45/001; B29C 45/18; B29C 45/73; B29C 45/77; B29C 45/78
See application file for complete search history.

(56) References Cited

U.S. PATENT DOCUMENTS

| | | | |
|---|---|---|---|
| RE27,145 E | 6/1971 | Jones | |
| 2005/0197464 A1* | 9/2005 | Handlin, Jr. .......... | C08L 53/025 525/314 |
| 2006/0155044 A1* | 7/2006 | Joly ...................... | C08L 53/02 524/505 |
| 2006/0205874 A1* | 9/2006 | Uzee ..................... | C08L 53/02 525/88 |
| 2014/0302947 A1* | 10/2014 | Sullivan ............. | A63B 37/0051 473/374 |
| 2014/0323243 A1* | 10/2014 | Sullivan ............. | A63B 37/0039 473/374 |
| 2015/0182807 A1* | 7/2015 | Bulpett .............. | A63B 37/0039 473/373 |
| 2016/0016048 A1* | 1/2016 | Sullivan ............. | A63B 37/0062 473/374 |

FOREIGN PATENT DOCUMENTS

WO 2014132718 A1 9/2014

OTHER PUBLICATIONS

International Search Report for PCT/US2016/024677, filed Mar. 29, 2016.
Taiwan Search Report dated Dec. 16, 2016 for TW105109899, filed Mar. 29, 2016.

* cited by examiner

*Primary Examiner* — Robert Harlan
(74) *Attorney, Agent, or Firm* — Ekatherina Serysheva

(57) ABSTRACT

The present disclosure provides a process for preparing a cured transparent rubber composition containing a synthetic isoprene polymer(s), a transparent polymer(s), a curing agent and additives. The process includes mixing the components at a temperature ranging from 50 to 130° C., curing the compound with peroxide and allowing the compound to mature. The maturated compound is fed to an injection molding machine. The cured transparent rubber composition prepared using the methods described herein has a haze of less than 30% and a total light transmission of more than 80%. The disclosure further provides an article including the cured transparent rubber composition, in particular for medical applications and artificial nipples.

17 Claims, No Drawings

CURED TRANSPARENT RUBBER ARTICLE, AND MANUFACTURING PROCESS FOR THE SAME

TECHNICAL FIELD

The present disclosure relates to a cured transparent rubber article, and a manufacturing process for the cured composition.

BACKGROUND OF THE INVENTION

Excellent curable transparent rubber compositions have been described in WO2014132718. Even though in this application an improved balance has been found between rubber properties such as hardness and strength on the one hand and transparency on the other hand, there is still a need for further improvement. Moreover, this reference is silent with respect to the method for preparing a cured transparent rubber article.

JP2005002225 provides a rubber composition that comprises 100 pts. wt. rubber like polymer and 5-150 pts. wt. wet silica based on 100 pts. wt. rubber like polymer. The rubber like polymer consists of 5-80 wt. % rubber like polymer (A) component having 1.535-1.600 refractive index at 23° C., and 20-95 wt. % rubber like polymer (B) component having 1.400-1.530 refractive index at 23° C. The manner by which the composition is to be used is not disclosed.

JPH05140379 provides a composition comprising a specific maleimide copolymer and an elastomer in a specified ratio that is excellent in the heat resistance, rigidity, and mechanical characteristics, and useful for automotive lenses. The composition comprises (A) 0.5-99.5 pts. wt. of a maleimide copolymer and and (B) 99.5-0.5 pts. wt. of an elastomer such as natural rubber having a difference of $<=0.01$, preferably $<=0.005$, between the refractive index of the component A and the refractive index of the elastomer at a wavelength of 589 nm. Various methods for moulding are disclosed. The document provides no information on the use of a peroxide curing agent. Transparency and haze still leave room for improvement.

Rubber articles may be made by a variety of moulding processes. Types of moulding methods includes blow moulding, compression moulding, extrusion moulding, injection moulding, rotational moulding, thermoforming, and the like. Injection moulding for instance is a manufacturing process for producing parts by injecting material into a mould cavity, where it cools and hardens to the configuration of the cavity. For thermosetting polymer, injection moulding is not the first choice, given the risk of chemical crosslinking in the screw of the injection moulding machine.

The inventors have set out to form cured transparent rubber articles with improved mechanical properties, improved tear strength in particular. Surprisingly, it was found that a particular method of forming articles at specific conditions, outperformed alternative production methods. Attractive properties, such as transparency (i.e., total transmittance greater than 80%, with haze below 30%, both according to ASTM D1003-13), abrasion resistance (ISO 4649, method A, of less than 200 mm$^3$), which is of interest for shoe soles and similar applications are retained.

Therefore now a new method has been found that allows the production of cured transparent rubber articles with improved mechanical properties.

SUMMARY OF THE INVENTION

Accordingly a process for preparing a cured transparent rubber composition is provided with a haze of less than 30% and a total light transmission of more than 80%, both measured according to ASTM D1003-13, comprising:
  (a) Preparing a compound from a solid curable rubber composition comprising the following components
    Component (a): from 24-90 wt. % of one or more synthetic isoprene polymers having a refractive index of between 1.500 to 1.525 at 23° C.;
    Component (b): from 9-75 wt. % of one or more transparent polymers different from isoprene polymers wherein the difference between the refractive indices of component (a) and (b) is 0.100 or less;
    Components (c) and (d): from 0.05-8.0 wt. % of a curing agent, optionally with a co-agent, and
    Component (e): from 0.01-20 wt. % of additives that do not influence the transparency,
  (b) Curing the compound
    wherein
    the compound is prepared by uniformly kneading a mixture of components (a) to (e) at a temperature in the range of 50 to 130° C.;
    the curing agent is a peroxide,
    the compound is maturated
    the maturated compound is fed to an injection moulding machine optionally provided with a feeder connected to a barrel with an inline screw connected to a mould with a cavity, with a feed zone temperature in the range of 30 to 60° C., a transition zone temperature and a metering zone temperature each in the range of 45 to 80° C. and a screw speed in the range of 80 to 130 RPM, and a mould with a cavity temperature in the range of 130 to 190° C.

The present disclosure also provides a transparent, cured rubber composition, based on the curable composition mentioned above.

DESCRIPTION OF THE INVENTION

Injection Moulding is the technique of injecting molten or low viscous material (here the compound) into a mould and forming a part. The main elements of a moulding machine are a feeder, for example a hopper or an active feeding system that holds the starting material. The optional feeder feeds a barrel containing the screw with the material. A feeder may not be necessary, feeding directly to the barrel is also an option. The viscosity of material is decreased in the barrel and with the help of the screw (piston) is injected into a mould. In the event of a thermoset material or material containing a thermoset, then in the mould the material is allowed to cure. The mould is then opened and the part, here the cured product, is ejected out of the mould.

The term of "haze" means the degree of dimness in a transparent material, measured according to ASTM D1003-13, by using 2 mm-thick sheet of a test material. The value of haze is determined as a percent of transmitted light which strays from the incident light in the angle of 0.044 rad or more by forward scattering.

The term of "TT" which stands for "total luminous transmittance" means the ratio of light beam passed through a transparent material, measured according to ASTM D1003-13. The value of total luminous transmittance is determined as the ratio of total transmitting light flux with respect to parallel incident light flux on a test article.

The term of "Type A Durometer Hardness" or "Hs" means the hardness of a rubber composition measured according to ASTM D2240. The value of Hs is determined, in the present specification, from the following procedure: constantly pushing a plunger onto a test article, and measuring the depth of the pushed plunger in the article at 0 sec or 30 sec after the pushing.

The term of "tear strength" means the tear strength of a rubber composition measured according to ASTM D624. The value of tear strength is determined, in the present specification, by using 2 mm-thick sheet of a test material, and converted in N/mm unit.

The term of "vinyl content" refers to the amount of a conjugated diene which is polymerized via 1,2-addition (in the case of butadiene-it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The vinyl content is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed in U.S. Pat. No. RE 27,145, which disclosure is incorporated by reference.

The terms of "plasticizer oil", "plasticizer", and "softener" mean a (oil-based) compound known as an additive for changing properties of a material in the art. The plasticizer may include, but not limited to, paraffin oil, mineral oil, ester oil, hydrocarbon-based synthetic lubricating oils, naphthenic oils, and vegetable oils.

As used herein, unless otherwise noted, the term "molecular weight(s)" refers to the true molecular weight in g/mole of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

The words of "comprising", "including", and "containing" mean in the present specification, unless otherwise noted, that an article or component connotes or has an element(s). The spirit of the words may embrace both an internal and external additions.

In the case that the word of "about", "around", or "appropriately" is prefixed to a value, in the present specification, the value can include a tolerance of at least plus/minus 10 percent.

Component (a)

Synthetic isoprene polymers are known. This definition includes homopolymers and copolymers of isoprene, wherein at least 50 mole % of the polymer backbone is based on isoprene. Homopolymers are often referred to as Isoprene Rubber, or IR. The isoprene polymer can be an anionically produced IR, IR produced by Ziegler-Natta catalysis, or with a neodymium catalyst. Natural rubber (NR) is likewise a homopolymer of isoprene. However, NR is not suitable. NR is not a synthetic isoprene polymer. Generally it lacks sufficient transparency and typically is too yellow or even brown. Copolymers include polymers comprising isoprene and another conjugated diene and/or olefinically unsaturated monomer in the polymer backbone. Examples include copolymers of butadiene and isoprene, or isoprene and styrene, and the like. Copolymers may be random, tapered, block or otherwise structured. Isoprene polymers may be linear or branched. Moreover, they may be functionalized.

To achieve better tear strength, the isoprene polymers preferably have a molecular weight greater than 250,000, more preferably greater than 500,000. Moreover, in term of isoprene homopolymers, they preferably have a cis content of greater than 80%. The high cis content is believed to be beneficial to the flexibility of the composition. Then again, the cis content is not the only factor influencing the flexibility, and isoprene homopolymers with a flexibility below 80% may still be useful.

It is important that the one or mixture of isoprene polymers used as component (a) has a refractive index of between 1.500 to 1.525 at 23° C. Best results have been achieved with anionically produced IR, such as Cariflex® IR0307 and Cariflex IR0310 (manufactured by Kraton Polymers). Anionically produced IR is therefore preferred. In terms of transparency/haze and yellowness index, next best results were achieved with IR produced with a neodymium catalyst, followed by IR produced by Ziegler-Natta catalysis.

Component (a) is preferably present in an amount of 24-84 wt. %, more preferably in an amount of 45-84 wt. %.

Component (b)

The polymer(s) used as component (b) has/have a refractive index that is very similar to that of component (a). Accordingly, the difference between the refractive indices of component (a) and (b) is 0.100 or less, preferably 0.050 or less, more preferably 0.020 or less.

Since component (b) is processed together with component (a), its mixing processing temperature should be relatively low. Polymers having a mixing processing temperature above 150° C. generally are not suitable as this would require elevated temperatures that may during prolonged mixing procedures adversely affect component (a) (discoloration and degradation). Preferably, the mixing processing temperature of component (b) is at most 135° C., more preferably at most 130° C.

Component (b) is preferably a butadiene polymer, more preferably polybutadiene. Provided it is transparent and the requirements in respect of the refractive index and mixing processing temperature are met, other polymers may be used instead or in combination with a butadiene polymer. Such polymers include polymers made from $C_4$ to $C_{20}$ olefins; thermoplastic elastomers (TPEs), styrene-butadiene rubber (SBR), ethylene-propylene rubber (EPM), ethylene-propylene-diene rubber (EPDM), urethane rubber, and any other polymer which is referred to as rubber in the prior art. Component (b) is preferably transparent.

Particularly suitable is syndiotactic 1,2-polybutadiene provided by JSR, e.g., grades RB810, RB820, RB830 or RB840.

Alternatively, component (b) may be a block copolymer. The block copolymer preferably used as component (b) in the composition of this disclosure will preferably have a simple structure A-B-Y-(B-A)n
wherein
  each A is independently a polymer block composed for at least 90 mole % of an alkenyl aromatic hydrocarbon;
  the content of A by weight of the total weight of the polymer (PSC) is in the range of 8-13%;
  Y is the remnant of a coupling agent having a functionality greater than 2;
  the degree of branching (DoB) is n+1, wherein n is an integer from 2 to 5, preferably 2 to 4;
  each B is independently a polymer block composed for at least 90 mole % of one or more conjugated dienes;
  the styrenic block copolymer has a coupling efficiency (CE) of at least 90%;
  each A block independently has a weight average molecular weight (MW A) ranging from 9,000 to 15,000, and
  each B Block independently has a weight average molecular weight (MW B) ranging from 75,000 to 150,000.

The radial styrenic block copolymer may comprise a small amount of uncoupled block copolymer. The uncoupled polymer has the AB structure. As indicated, the A block is a block mainly composed of polymerized alkenyl aromatic hydrocarbon and the B block is a block is mainly composed of polymerized conjugated diene or dienes. For the purposes of the present disclosure, the expression mainly indicates that no more than 10 mole %, preferably less than 5 mole % of copolymerizable monomers may be present.

The blocks A preferably have average molecular weights between about 10,000 and about 12,000. The blocks B preferably have average molecular weights between about 80,000 and about 120,000. The average molecular weights of the alkenyl aromatic hydrocarbon polymer end blocks are determined by gel permeation chromatography, whereas the alkenyl aromatic hydrocarbon polymer content of the block copolymer is measured by infrared spectroscopy of the finished block polymer. The weight percentage of the A blocks in the finished block polymer should be between 8 and 13%, preferably 10% and 12% by weight.

Component (b) is preferably present in an amount of 14-70 wt. %.

Components (c) and (d)

The curing agent (c) is preferably a peroxide in view of low contamination and therefore higher transparency in a final product. Excellent results have been achieved with peroxides selected from the group consisting of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethyl-hexanoyl) peroxide, dilauroyl peroxide, 1,1,3,3-tetramethyl-butylperoxy-2-ethylhexanoate, disuccinic acid peroxide, 2,5-dimethyl-2,5-di(2-ethyl-hexanoylperoxy)hexane, t-hexylperoxy-2-ethylhexanoate, di(4-methyl-benzoyl) peroxide, t-butylperoxy-2-ethyl-hexanoate, di(3-methyl-benzoyl) peroxide, benzoyl(3-methyl-benzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di(t-butylperoxy)cyclohexyl)propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy)butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethyl-butyl hydroperoxide, cumene hydroperoxide, and t-butyl hydroperoxide.

More preferably, the peroxide is 2,5-dimethyl-2,5-di(t-butylperoxy)hexane (e.g., Trigonox® 101 from AKZO or Perhexa® 25Bby NOF Corporation), or 1,1-di(tert-butylperoxy)cyclohexane (eg. Perhexa® C by NOF Corporation, Luperox® 331M80 from Arkema, or Trigonox 22 from AKZO) in order to suppress malodour and residue amount. Also suitable given its stability and ease of use is 2,5-dimethyl-2,5-di(t-butylperoxy)hexyne-3 (e.g., Trigonox 145 from AKZO).

The amount of curing agent (c) may also be expressed in terms of parts by hundred parts of curable components, here components (a), (b) and (d). Preferably, the amount of curing agent (c) varies from 0.05 to 1.5 phr, more preferably from 0.1 to 1.0 phr.

As co-agent (d) any one or more selected from the group consisting of ethylene glycol methacrylate (EGDMA), trimethylolpropane trimethacrylate (TMPTMA), triallyl isocyanurate, triallyl cyanurate, diethylene glycol diacrylate, and neophenylene glycol diacrylate may be used.

Co-agent (d) is optional. The lower limit is therefore zero. Then again, its amount will not be more than 7.95 wt. %, when used with 0.05 wt. % of curing agent. With minute amounts of curing agent, e.g., in the range of 0.05-0.1 wt. % of curing agent, the relative amount of co-agent may be high. For instance, the weight ratio (c) to (d) in the above example with 7.95 wt. % co-agent used with 0.05 wt. % of curing agent is 1:159. The weight ratio may therefore vary from 100:1 to 1:100. With small amounts of curing agent, e.g., 0.01-0.09 wt. % of curing agent, the weight ratio may vary up to 1:88, With minor amounts of curing agent, e.g., 0.1-0.15 wt. % of curing agent, the weight ratio may vary up to 1:53. In higher amounts of curing agent, the curing agent and the co-agent are preferably used in a weight ratio (c) to (d) of 1:2-10, more preferably 1:3-7. Particularly preferred combinations are (2,5-dimethyl-2,5-di(t-butylperoxy) hexane, 1,1-di(tert-butylperoxy)cyclohexane or 2,5-dimethyl-2,5-di(t-butylperoxy)hexyne-3 as component (c) with EGDMA or TMPTA as component (d).

Additives (e)

The composition of the present embodiments may further include additional components as long as the component(s) do not (in the amount used) affect the haze and transparency. The additional component may include, but is not limited to, colorants, modifiers, finishing agents (e.g., zinc laurate), antioxidants (e.g., monophenol, bisphenol, polyphenol, sulfur, phosphorus-based compounds such as Irganox® 1010, Irgafos® 168, Irganox® 1726 and Irganox PS800 manufactured by BASF), reducing agents, oxygen scavengers, light stabilizers, antacids, pH stabilizers, surface treatment agents, heat stabilizers, colorants, fillers, surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, and polyphosphoric acid. In particular large amount of fillers, dusting agents, and similar non-transparent additives should be avoided, and is preferably kept to at most 5 wt. %, preferably at most 2 wt. %. A common additive that is preferably avoided, with a preferred maximum of 1 wt. %, is carbon black. Higher amounts will quickly and adversely affect the haze and transparency of the composition. Similar upper limits exist for inorganic fillers and the like.

Preferably, the present composition is substantially free of oil as a softener to avoid oil bleeding.

The colorant may be used such that the composition has transparent or translucent colouring such as clear blue, clear red, and clear green. The colorant may include any conventional colorants used in the art, such as colour pigments, extender pigments, anti-corrosive pigments, and functional pigments (e.g., phthalocyanine green, titanium, iron blue, iron oxide, lead suboxide, and zinc sulfide).

The transparent composition of the present embodiments may preferably have less than 30% of haze, more preferably 25% or less of haze in view of enough transparency. If the haze is 35% or more, the transparency of the composition will be too low to meet the practical and aesthetic needs of the market.

The composition of the present embodiments may preferably have 25 or more of Type A Durometer hardness measured at 30 seconds, more preferably from 30 to 40, which is ideal for medical applications, and artificial nipples and the like.

Preferably, the present composition has 80% or more, preferably 84% or more of total luminous transmittance measured according to ASTM D1003-13. If the total luminous transmittance is less than 80%, the composition will lack enough transparency.

Preferably, the composition has 10 N/mm or more, preferably 10 N/mm to 50 N/mm, more preferably 10 N/mm to 40 N/mm of tear strength measured by 2 mm-thick sheet (and converted in N/mm unit) according to ASTM D624. If the tear strength is less than 10 N/mm, the composition may lack durability.

Compounding Procedure

The compounding process preferably comprising the acts of:
mixing components (a), (b) and (e) to obtain a mixture thereof;
optionally adding co-agent (d) to the mixture; and finally adding a curing agent (c)
uniformly kneading the mixture and maturating the same.

The conditions for mixing and for maturating are well-known to a person skilled in the art and depends on the equipment used. Mixing may for instance be performed according to a "roller mill procedure". This will start with the mastication of the synthetic polyisoprene using a roller mill that is operating at conventional conditions. Roller speed will generally be in the range of 17 to 20 rotations per minute, whereas the rollers are maintained at about 55° C. In step 1, components (b), (e) and (a) are combined with the masticated synthetic polyisoprene. One may start with component (b) and introduce this onto the roller mill. The roller mill may be operated at about 120° C. Next component (a), the masticated synthetic rubber, component (e) and/or component (d) may be added. The order is not important, as long as the produced is well mixed and the product remains transparent and basically colourless. Due to friction the temperature may rise. Preferably the mixing of the components is done at 130° C. or less. Higher temperatures may be used, e.g., where the temperature is allowed to rise to 150° C. despite the negative effects on the colour and stability of component (a), provided the time that component (a) is subjected to the elevated temperature is kept short. Once the mixing is completed, the mixture is removed from the roller mill ("sheet off").

In step (2), the roller mill is operated at about 75° C. and now the components (c) and (d) are added. Preferably component (d), if any, is added first. The procedure is similar to that of step (1), whereby elevated temperatures that may cause pre-cure are (obviously) to be avoided. The product is again sheeted off. Mixing may also be performed with an internal mixer. For instance, using an internal mixer operating at 64 rotations per minute, it is recommended to masticate the synthetic polyisoprene first. To this the components (b), (e) and (c) and (d) are added. Preferably the core temperature of the mixture is below 135° C. In step (2) the internal mixture is set to about 50° C. and first component (d) is added. Next component (c) is added. To avoid pre-cure, the core temperature of the mixture should preferably not exceed 90° C.

Preferably the mixture is allowed to maturate before use. It is recommended for maturation to maintain the compound at about ambient temperature for at least 2 or more hours, preferably 6 or more hours, more preferably 10 or more hours.

Injection Moulding Procedure

Various methods for preparing products made from a cured rubber composition are known. For instance, medical stoppers, needle shields, footwear products, damping materials, building components, sex toys, artificial nipple, seals, kitchenware and many other applications are frequently made by compression moulding, injection moulding and transfer moulding. Injection moulding with a sulphur curing agent is known, but such products lack transparency. That transparent products can be made by injection moulding with a compound comprising a peroxide curing agent was unknown. That the product would even outperform those made by any of the other methods, and compression moulding in particular, was likewise unknown and highly surprising. During injection moulding peroxide curing agents are typically deactivated by the presence of oxygen, included in the compound, at elevated temperatures. In the process of the present disclosure this is avoided by selecting the proper machine (which excludes the presence of air pockets and hence of oxygen); selecting the proper temperatures (here relatively low), and selecting the proper compound (here with a relative low viscosity at low temperatures in the feed zone, transition zone, metering zone and mould cavity). Therefore now cured transparent products can be made by injection moulding with improved mechanical properties. Moreover, curing time is significantly reduced.

Curable rubber compositions tend to be sticky. Moreover, conditions in an injection moulding apparatus appear to adversely affect the transparency of the product. Thus, surprisingly it has now been found that injection moulding, with a specific selection of the components in the compound and with a specific selection of moulding conditions is not only possible, but results in products with improved properties vis-à-vis products made from the same compositions by compression moulding.

Apparatuses for rubber injection moulding are known. Various designs have been developed, from vertical to horizontal injection moulding machines. For transparency and improved mechanical properties specific conditions should be used. The conditions are illustrated by way of example with the aid of a DESMA Hydro-Balance machine with a 25 mm screw and a 350 ccm barrel. The disclosure is not limited to this machine. Moreover, recommended curing times and temperatures on other machines may be slightly different. It is moreover important to employ a machine with an appropriate form of feeding and adapted geometry of the screw and barrel which ensures that little or no air (oxygen) is captured during the process.

By way of injection moulding, shorter curing time is needed as compared to compression moulding and other methods. The injection moulding time may vary from 3-8 minutes, and is about 2 minutes less when compared to the typical time required for compression moulding of a similar article. Likewise the injection moulding temperature varies from 130 to 180° C. and is about 10° C. less when compared to the typical temperature required for compression moulding.

Vertical and horizontal screw inline injection moulding machines may be used. For handling reasons of the slightly sticky strips of compound used in the process of the present disclosure, horizontal injection moulding machines are preferred.

Injection moulding machines may be equipped with a dedicated feeding means. For instance, DESMA injection moulding machines are provided with injection units that apply the First-in-First-out (FiFo) principle. Anyway, the compound is preferably fed in the form of small stripes of about 40×5 mm at various lengths or ribbon of about 40×5 mm. Preferably, industrial environment, an active feed roller is used, which is very effective to feed compounds and in particular soft sticky IR compounds.

A general purpose injection moulding machine has a screw with three main sections. Generally, each section has its own geometry and purpose. The feed zone is the portion of the screw that picks up the material from the base of feeding system and begins to decrease the viscosity of the compound as it is conveyed. Generally the flight depths (feed depth) is constant. This is followed with a compression zone (also referred to as transition zone) wherein the flight depth decreases, causing the compound to further decreasing the viscosity and eliminating air pockets. Finally there is a metering zone wherein the depth of the flights is minimum but constant, to control the amount of the low viscosity compound that is metered into the mould.

As indicated, the maturated compound may be fed to an injection moulding machine provided with an active feeding system connected to a barrel with an inline screw connected to a mould with a cavity, with a feed zone temperature in the range of 30 to 60° C., a transition zone temperature and a metering zone temperature each in the range of 45 to 80° C. and a screw speed in the range of 80 to 130 RPM, and a mould with a cavity temperature in the range of 140 to 190° C. Preferably the temperature in the feed zone is in the range of 35 to 55° C. Preferably the temperature in the transition zone and metering zone is from 50 to 76° C. The preferred temperature in the mould cavity is in the range from 150 to 180° C.

Preferably, the injection speed is from 5 to 20 ccm/s. Obviously this also depends on the complexity of the mould cavity and article to be produced. The injection pressure is preferably in the range of 35 to 100 bar, but may vary from 25 to 120 bar. The clamping force obviously needs to exceed this, and is typically in the range of about 250 bar or more. The after pressure in the mould may vary from 40 to 70 bar, preferably from 50 to 60 bar.

As mentioned before, slightly different conditions may be found when using machines from other suppliers, also depending on the geometry of the product to be made and the geometry of the screw that is used. For instance, the injection moulding machine may employ a single screw, dual screws or even multiple screws. The pitch of the screws may vary, as may the feed depth and the metering depth.

Application

The composition of the present embodiments may be used in any industrial fields that can utilize its high transparency in combination with high tear strength and other mechanical properties. The industrial use may include, but not limited to, tubes, medical stoppers, catheters, dental dams and other medical applications, footwear products, tires, clothes and underclothes, masks, rain gear, protective glasses and goggles, toys, damping materials, building components, coating material for wiring, packaging materials, protection members for computers, computer peripherals, contraceptive devices, sex toys, artificial nipple, disposable diapers, stationery, containers, food trays, balls for sports, ball chairs, and protection films, seals, key covers and the like.

The composition of the present embodiments may preferably be used to manufacture medical applications and artificial nipples and the like, having high transparency and tear strength that cannot be produced by compression moulding and similar methods.

Note that the aforementioned applications are mere examples of the present embodiments.

EXAMPLES

Embodiments of the present disclosure will now be further illustrated with reference to the following examples, however, without restricting its scope to these embodiments.

TABLE 1

|     | Ingredient    | 1    | 2    | 3    |
|-----|---------------|------|------|------|
| (a) | Cariflex ® IR307 | 47.0 | —    | 84.0 |
| (a) | Neodymium IR  | —    | 47.0 | —    |
| (b) | JSR RB 810/820 | 47.0 | 47.0 | 14.9 |
| (c) | Trigonox ® 101 | 0.94 | 0.94 | 0.44 |
| (d) | EGDMA         | 4.69 | 4.69 | —    |
| (e) | Irganox ® 1726 | 0.47 | 0.47 | 0.5  |

Examples 1-3 (Compounding)

Components (a), (b), and (e) were uniformly kneaded in an open roller at a temperature of ±120° C. Components (c) and (d) were added in an open roller at a temperature of ±75° C. and again the mixture was uniformly kneaded. The kneaded rubber was cut off from the roller to a sheet having 2 mm to 3 mm thickness. The sheet was maturated at room temperature for one day and night.

Examples 1-3, Compression Moulding (C)

The matured rubber was cured or vulcanized by heating press machine (manufactured by Fontijne Grotnes BV) at the temperature of 150° C. and the pressure of 15 MPa for 6 minutes to obtain a test sample which was subjected under the test procedures discussed hereinbefore to measure the physical and chemical properties. Examples 2-3 (C) were repeats of Example 1 (C). The results of these experiments are listed in Table 2.

Examples 1-3, Injection Moulding (I)

The matured rubber was cured or vulcanized by feeding a DESMA injection moulding machine with active feeder system, operating a temperature in the feed zone of 50° C., at transition zone and metering zone of 76° C. and cavity temperature of 140° C. The screw speed was 110 RPM with a shot volume of 104.5 ccm and an injection speed of 8 ccm/s at an injection pressure of 40-45 bar. Examples 2-3 (I) were repeats of Example 1 (I), but now at a slightly higher temperature in the feed zone (55° C.), slightly higher screw speed (120 RPM) and slightly lower injection speed (7 ccm/s). The curing times was 3 minutes for Examples 1 (I) and 2 (I), and 7 minutes for Example 3 (I), which is considerably faster than the curing times for the compression moulded parts. The results are likewise listed in Table 2.

TABLE 2

| Method | Property | Unit | Ex. 1 (C) | Ex. 1 (I) | Ex. 2 (C) | Ex. 2 (I) | Ex. 3 (C) | Ex. 3 (I) |
|---|---|---|---|---|---|---|---|---|
| ISO 37: 2005 | Tensile strength | MPa | 9.62 | 9.11 | 10.37 | 7.81 | 6.17 | 5.75 |
| ISO 37: 2005 | Modulus at 100% | MPa | 4.46 | 2.99 | 4.12 | 2.89 | 0.49 | 0.52 |
| ISO 37: 2005 | Elongation at break | % | 148 | 265 | 167 | 255 | 1404 | 1214 |
| ASTM D624 | Tear Strength | kN/m | 20.35 | 26.2 | 16.9 | 26.2 | 11.9 | 16.1 |
| ASTM D2240 | Hardness Shore A, 30 sec. |  | 65 | 66 | 62 | 65 | 26 | 22.4 |
| ISO 4649, method A | Abrasion | $mm^3$ | 75 | 51 | 141 | 51 | n.a | n.a. |
| ASTM D1003-13 | Haze | % | 4 | 4.3 | 23 | 13 | 4 | 7.1 |
| ASTM D1003-13 | Total Transmittance | % | 91 | 90 | 87 | 87 | 91 | 89 |
| ASTM E313 | Yellowness Index |  |  | 0.6 | n.a | 3.41 | 5.16 | n.a. | 1.2 | the maturated compound is fed to an injection moulding machine optionally provided with a feeder connected to a barrel with an inline screw connected to a mould with a cavity, with a feed zone temperature in the range of 30 to 60° C., a transition zone temperature and a metering zone temperature each in the range of 45 to 80° C. and a screw speed in the range of 80 to 130 RPM, and a mould with a cavity temperature in the range of 130 to 190° C.

2. The process according to claim 1, wherein component (a) is a homopolymer of isoprene.

3. The process according to claim 1, wherein component (a) is a homopolymer of isoprene, made by anionic polymerization.

4. The process according to claim 1, wherein component (a) is present in an amount of 45-84 wt. %.

5. The process according to claim 1, wherein the difference between the refractive indices of component (a) and (b) is 0.050 or less.

6. The process according to claim 5, wherein component (b) has a mixing processing temperature of at most 150° C.

The invention claimed is:

1. A process for preparing a cured transparent rubber composition with a haze of less than 30% and a total light transmission of more than 80%, both measured according to ASTM D1003-13 comprising:
  (a) Preparing a compound from a solid curable rubber composition comprising the following components
    Component (a): from 24-85 wt. % of one or more synthetic isoprene polymers having a refractive index of between 1.500 to 1.525 at 23° C.;
    Component (b): from 14-75 wt. % of one or more transparent polymers different from isoprene polymers wherein the difference between the refractive indices of component (a) and (b) is 0.100 or less;
    Components (c) and (d): from 0.05-8.0 wt. % of a curing agent, optionally with a co-agent, and
    Component (e): from 0.01-20 wt. % of additives that do not influence the transparency,
  (b) Curing the compound
  wherein
    the compound is prepared by uniformly kneading a mixture of components (a) to (e) at a temperature in the range of 50 to 130° C.;
    the curing agent is a peroxide;
    the compound is maturated, and 7. The process according to claim 6, wherein component (b) is selected from one or more of the group comprising butadiene polymer, polymers made from C4 to C20 olefins; thermoplastic elastomers (TPEs), styrene-butadiene rubber (SBR), ethylene-propylene rubber (EPM), ethylenepropylene-diene rubber (EPDM), urethane rubber.

8. The process according to claim 1, wherein component (b) is a syndiotactic 1,2-polybutadiene rubber.

9. The process according to claim 1, wherein component (b) is selected from one or more of block copolymers having a simple structure A-B-Y-(B-A)$_n$
  wherein
    each A is independently a polymer block composed for at least 90 mole % of an alkenyl aromatic hydrocarbon;
    the content of A by weight of the total weight of the polymer (PSC) is in the range of 8-13%;
    Y is the remnant of a coupling agent having a functionality greater than 2;
    the degree of branching (DoB) is n+1, wherein n is an integer from 2 to 5, preferably 2 to 4;
    each B is independently a polymer block composed for at least 90 mole % of one or more conjugated dienes;
    the styrenic block copolymer has a coupling efficiency (CE) of at least 90%;

each A block independently has a weight average molecular weight (MW A) ranging from 9,000 to 15,000, and each B Block independently has a weight average molecular weight (MW B) ranging from 75,000 to 150,000.

10. The process according to claim 9, wherein component (b) is a block copolymer the blocks A of which have weight average molecular weights between about 10,000 and about 12,000, and the blocks B thereof have weight average molecular weights between about 80,000 and about 120,000, and wherein the weight percentage of the A blocks in the block polymer is between 10% and 12% by weight.

11. The process according to claim 1, wherein component (b) is present in an amount of 14-70 wt. %.

12. The process according to claim 1, wherein component (c) is a peroxide, preferably 2,5-dimethyl-2,5-di-(t-butylperoxy)hexane, 1,1-di(tert-butylperoxy)cyclohexane, or 2,5-dimethyl-2,5-di-(t-butylperoxy)hexane.

13. The process according to claim 12, wherein a co-agent (d) is used in a weight ratio (c) to (d) of 1:2-10, preferably 1:3-7.

14. The process for according to claim 1, wherein the compound is maturated for at least 12 hours.

15. The process for according to claim 1, wherein the maturated compound is fed to an injection moulding machine provided with a hopper connected to a barrel with an inline screw connected to a mould with a cavity, with a feed zone temperature in the range of 35 to 55° C., a transition zone temperature and a metering zone temperature each in the range of 50 to 78° C. and a screw speed in the range of 90 to 120 RPM, and a mould with a cavity temperature in the range of 140 to 170° C.

16. An article prepared by the process according to claim 1.

17. The article according to claim 16, wherein the article IS selected from the group consisting of tubes, medical stoppers, catheters, dental dams and other medical applications, footwear products, tires, clothes and underclothes, masks, rain gear, eyewear, toys, damping materials, building components, coating material for wiring, packaging materials, protection members for computers, computer peripherals, contraceptive devices, sex toys, artificial nipples, disposable diapers, stationery, containers, food trays, balls for sports, ball chairs, protection films, seals, and key covers.

* * * * *